July 23, 1940.  I. RYBÁR  2,209,140
DAMPING MECHANISM FOR OSCILLATING SYSTEMS
Filed July 6, 1938
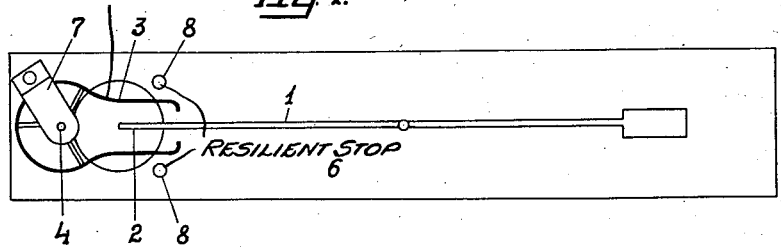
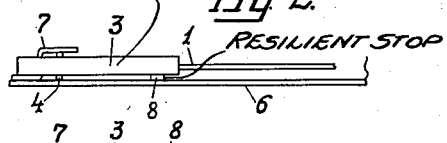
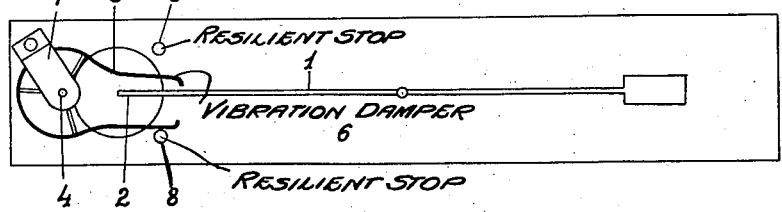
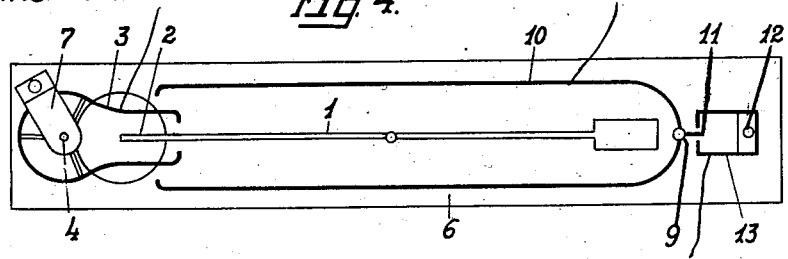
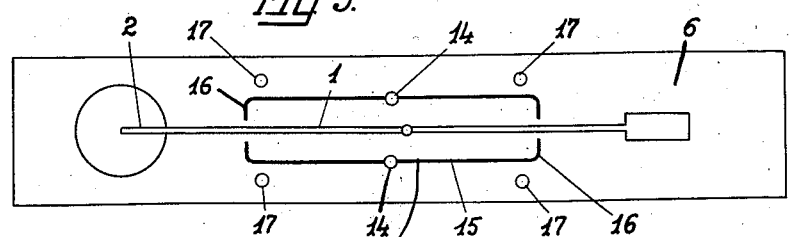
Inventor:
István Rybár
By: Glascock Downing & Seebold
Attys.

Patented July 23, 1940

2,209,140

UNITED STATES PATENT OFFICE 2,209,140

DAMPING MECHANISM FOR OSCILLATING SYSTEMS

István Rybár, Budapest, Hungary, assignor of one-half to the firm Präcisions Mechanische und Optische Anstalt Ferdinand Süss A. G., Budapest, Hungary Application July 6, 1938, Serial No. 217,829
In Hungary July 6, 1937

4 Claims. (Cl. 265—1.5)

The present invention relates to means for damping the oscillations of swinging bodies such as the pendulums of instruments.

There are known measuring instruments, in which an oscillating system, for example a torsion pendulum is suspended and when measuring therewith, the state of equilibrium of the pendulum is to be observed. An instrument of this kind is for instance Coulomb's and Eötvös's torsion pendulum. If an apparatus comprising such a pendulum is removed or set in another azimuth, due to the movement of the apparatus, the pendulum is vehemently agitated, it knocks alternately against the opposite walls of its box or against the stops arranged therein and then owing to the shocks and to the damping effect of the air contained in the box its movement is slowed down and finally after the last shock, by the damping action of the air only, aperiodically or carrying out a damped oscillation, it attains the state of equilibrium.

In case of a pendulum used in practice it is of great importance that this damping should be accomplished as quickly as possible, as thus the time of measuring will become considerably shorter. The damping after the last shock of the pendulum may be increased only to a certain limit without endangering the sensitivity of the pendulum. Therefore, there is a tendency to increase damping by reducing as much as possible the time elapsing during the shocks of the pendulum, that is the time between the coming into rest of the apparatus and the last shock of the pendulum.

With this object in view it has been proposed to employ elastic stops, for instance stops of cork, paper or stops constituted by metal wire springs, which, when receiving the shocks of the oscillating pendulum, are bent or compressed and thus absorb a part of the kinetic energy of the oscillating pendulum. However, after this the elastic stops endeavour to regain their original shape and by this they impart to the pendulum a considerable part of the kinetic energy absorbed so that the latter leaves the stops at a relatively high speed.

The invention has for its object to provide stops which use the energy absorbed from the oscillating pendulum to move their own mass and thus the absorbed energy is not given back to the pendulum and this provision renders possible a very good damping by means of a simple construction and without reducing the sensitiveness of the pendulum.

With this object in view a movable, preferably fork-like stop of suitable mass is employed, which embraces with its two tines the end of the pendulum so that the latter during its oscillation when striking alternately against the two tines of the fork pushes the fork and by this a considerable part of its energy is transmitted to the stop by which the movement of the pendulum—due to the reaction caused by the shock—is greatly damped.

If the pendulum is not fully damped by the first shock and when leaving this tine of the stop fork it strikes against the other tine of the stop fork which has been pushed away by the first shock, the above described damping is produced once more and so on.

In the annexed drawing some embodiments of the invention are represented by way of example.

Fig. 1 is a diagrammatic plan view of Eötvös's pendulum in the middle position of the stop fork.

Fig. 2 is a partial side elevation of the same.

Fig. 3 is also a plan view, but in one extreme position of the stop fork.

Finally Figs. 4 and 5 show two further embodiments.

The end 2 of pendulum 1 extends between the tines of stop fork 3 mounted on a pivot 4. The fork 3 is constituted by a substantially horse-shoe-shaped plate which is mounted at the centre of its bent portion by the aid of a hub supported by spokes. The pivot 4 projects at its lower part into the base plate 6 and at the upper part into the twice bent bearing plate 7. The ends of the tines of the fork are bent inwardly as shown in the drawing. The turning of fork 3 about pivot 4 is limited by stops 8 which are of cork or any other elastic material or may be spring-controlled to avoid a hard shock of the fork.

If the pendulum 1 is oscillated and it strikes against one of the tines of fork 3 it transmits its energy to the stop fork. Should this position be the state of equilibrium of the pendulum it remains immobile. However, if the striking position is not the state of equilibrium of the pendulum the pendulum will swing backwards and will strike against the other tine of the fork, but now with a considerably damped energy. After a few oscillations of this kind the oscillations of the pendulum are damped to such an extent that it does not touch the tines of the fork and thereafter it is stopped by the damping action of the air.

It is probable that the pendulum, which at first causes the stop fork 3 to move against the stops 8, will later reciprocate the fork with a less stroke and consequently, the fork will stop about in the middle position. It may occur that the pendulum after moving the fork 3 into its extreme position stops due to the damping effect of the air and thus it does not touch the fork any more, consequently, the latter remains in its extreme position represented in Fig. 3. Thus it is necessary to choose the space between the tines of fork and the path of the fork in such a way that the tines of the fork will not touch the pendulum when the same is in the state of equilibrium.

To increase the damping effect, the above described damping fork or damping device may be arranged at both ends of the pendulum.

The limiting stops may also have the form of a stop fork so that the first damping fork might move like the pendulum between the tines of another fork. This embodiment is shown in Fig. 4, wherein the tines of the fork 3 strike against the tines of a fork 10 oscillating on a pivot 9. The projection 11 of the fork 10 extending beyond the pivot 9 may strike against the tines of a fork 13 oscillating on a pivot 12.

In the embodiment shown in Fig. 5 a two-armed lever 15 oscillating on pivot 14 is arranged at each side of the oscillating member 1 and the ends 16 thereof are directed towards the oscillating member in such a way that the latter may strike during its oscillations against the ends 16 of levers 15. In order to limit the oscillations of the levers, stops 17 may be provided on both ends thereof. If desired, a two-armed lever 15 may be arranged also on one side only of the oscillating member.

The expression "fork" in this specification is to be taken in the most general sense thereof, and it may include any element which surrounds the pendulum with two arms or projections either at its ends or at any other point.

I claim:
1. In an instrument having an oscillating pendulum, a damping fork having tines pivotally mounted adjacent said pendulum, a part of the pendulum projecting between the tines of said fork for moving the same and damping the pendulum, and a further pivotally mounted damping fork embracing the tines of the first mentioned fork.

2. In an instrument having an oscillating pendulum, a damping fork having tines swingable between two extreme positions, a part of said pendulum projecting between the tines of said fork for moving the same and damping the pendulum, abutments limiting the movements of said fork, said tines being spaced with respect to each other so that the pendulum when in equilibrium will not engage the fork when the same is in either extreme position.

3. In an instrument having an oscillating pendulum, a pivoted damping lever having abutting portions swingable between two extreme positions, said pendulum engaging said abutting portions of said lever for moving the latter and damping the pendulum, abutments limiting the movement of said lever, said abutting portions being disposed in such a manner that the pendulum when in equilibrium will not engage said lever when the latter is in either extreme position.

4. In an instrument having an oscillating pendulum, rocking means having abutting portions swingable between two extreme positions, said pendulum engaging said abutting portions of said rocking means for moving the latter and damping the pendulum, and abutments limiting the movement of said rocking means, said abutting portions being disposed in such a manner that the pendulum when in equilibrium will not engage said rocking means when the latter is in either extreme position.

ISTVÁN RYBÁR.